Patented Aug. 9, 1927.

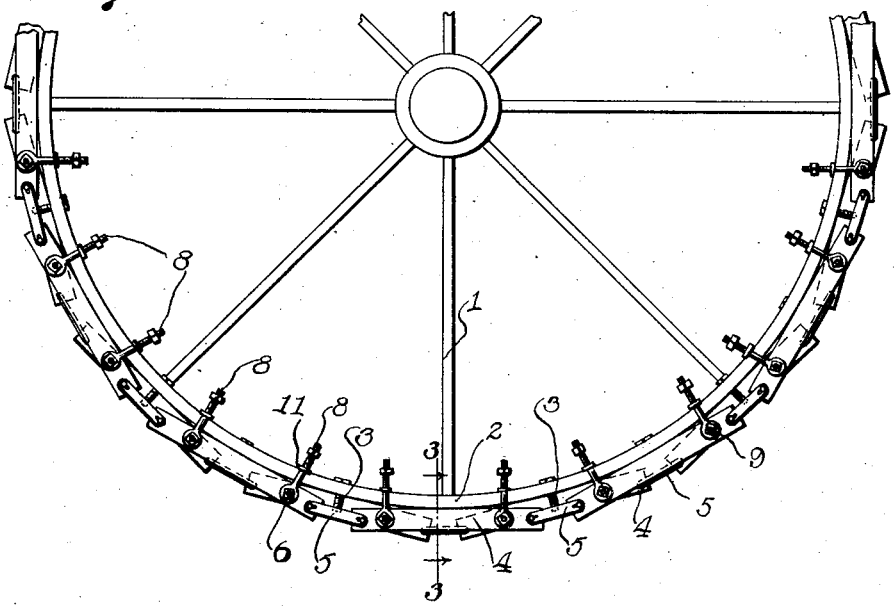
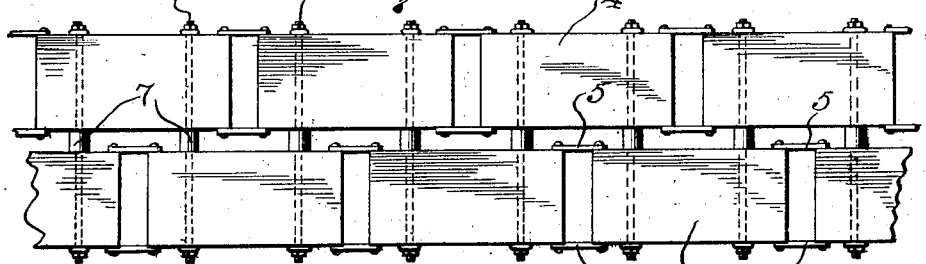
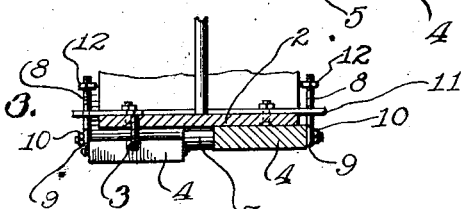

1,638,449

UNITED STATES PATENT OFFICE.

CHARLES B. MOORE, OF MATTOON, ILLINOIS.

TREAD ATTACHMENT FOR WHEELS.

Application filed June 25, 1926. Serial No. 118,531.

This invention is a tread attachment for wheels and has for its object the provision of an inexpensive device which may be easily applied to the wheel of a vehicle to afford a wide bearing therefor and prevent the same sinking into sandy or muddy roads. An object of the invention is to provide a device for the stated purpose which, when applied to a wheel, will be so disposed that there will always be an appreciable flat tread portion presented to the ground to provide a firm support for the wheel and obtain effective traction. The invention provides a tread member which may be readily applied to or removed from the wheel and will conform to the curvature of the wheel rim. The invention is illustrated in the accompanying drawing and will be hereinafter fully set forth, the novel features being particularly pointed out in the appended claims.

In the drawing:

Figure 1 is a side elevation of a portion of a wheel showing the application of my invention thereto;

Fig. 2 is a plan view of a portion of the attachment removed from the wheel;

Fig. 3 is a transverse section on the line 3—3 of Fig. 1.

The wheel, a portion of which is indicated at 1 may be of any approved design. In carrying out the present invention, there are secured in the rim 2 of the wheel at equal distances throughout its circumference calks 3 which project radially from the rim and are so disposed that they will project between the adjacent ends of two members of the attachment and thereby aid in preventing the attachment slipping circumferentially of the wheel. These projections or calks also are adapted to enter the surface of the ground and aid in the traction of the wheel. The tread attachment comprises an endless chain of blocks 4 which have flat inner and outer faces and are rectangular in outline, as clearly shown in the drawing. These blocks are connected end to end by links 5 which are disposed at the opposite sides and opposite ends of the blocks and have their own ends pivotally and slidably attached to the side edges of the respective blocks, as will be understood upon reference to Figs. 1 and 2 of the drawing, to accommodate the varying angular relation of the parts. The chain of blocks and coupling links may thus be disposed about the wheel, as shown in Fig. 1, and will readily conform to the circumference of the wheel so as to completely encircle the same. If the wheel is narrow, a single chain of tread blocks may be sufficient but ordinarily two parallel chains of blocks will be employed and the blocks will be so disposed as to break joint whereby there will always be at least one block presented flat to the surface of the ground and the wheel will, consequently, always have a broad bearing upon the ground and will be prevented from sinking thereinto. The blocks in the two chains are connected side by side by transverse bolts 6 inserted through the blocks adjacent the ends thereof with sufficient looseness to permit the blocks to move pivotally with respect to the bolts. Spacing sleeves 7 are fitted upon these bolts between the adjacent blocks so that the two chains or series of tread blocks will be maintained in a fixed spaced relation and thereby be maintained in the proper relation to the rim of the wheel. I also provide a plurality of eye bolts 8 which have their eyes 9 engaged around the ends of the bolts 6 and held thereto by the nuts 10 which also serve to retain the bolts 6 in the tread blocks. These eye bolts 8 are disposed radially with respect to the wheel and pass loosely through transverse straps 11 which are secured upon the inner side of the wheel rim. Nuts 12 are fitted upon these eye bolts so as to prevent them dropping from the wheel or the retaining straps 11 but are adjusted so that ample play for the bolts will be permitted to accommodate the shifting angular pivotal movement of the blocks as they successively engage the ground. While I have shown the transverse straps 11, it will be understood that, if the wheel rim is unusually wide, the bolts may be inserted through openings provided therefor in the rim and the said straps dispensed with.

From the foregoing description, taken in connection with the accompanying drawing, it will be seen that I have provided a very simple attachment which may be easily applied to or removed from a wheel as its use may or may not be necessary, and by the use of which a substantial tread surface will be afforded the wheel and it will be prevented from sinking in soft or sandy soil and may move over the same without imposing excessive strain upon the motive power.

Having thus described the invention, I claim:

1. A tread attachment for wheels comprising parallel series of flat blocks, links pivotally connecting the opposed ends of adjacent blocks in the respective series, retaining elements pivotally engaged through the blocks of the respective series adjacent the ends thereof, and spacing means carried by the said elements between adjacent blocks of the two series.

2. A tread attachment for wheels comprising parallel series of flat blocks, links pivotally coupling the opposed ends of adjacent blocks in the respective series, the blocks and links being arranged to break joint, pivot members inserted transversely through the blocks near the ends thereof whereby to connect the blocks side by side, spacing elements disposed between the opposed edges of adjacent blocks, carrying devices pivotally engaged at their outer ends with the several blocks, and means for loosely retaining the said elements upon a wheel rim.

3. A tread attachment for wheels comprising a series of flat tread blocks, links pivotally connecting the opposed ends of adjacent blocks, straps to be secured transversely upon a wheel rim, and eye bolts mounted through the ends of said straps and pivotally connected at their outer ends to the respective blocks adjacent the ends of the same.

In testimony whereof I affix my signature.

CHARLES B. MOORE. [L. S.]